S. I. PARKER.
VALVE AND VALVE ACTUATING ARRANGEMENT OF INTERNAL COMBUSTION ENGINES.
APPLICATION FILED SEPT. 17, 1909.

964,308.

Patented July 12, 1910.

3 SHEETS—SHEET 1.

WITNESSES
R. C. Braddock
Emory L. Groff

INVENTOR
Samuel Isaac Parker
By ......
his attorney

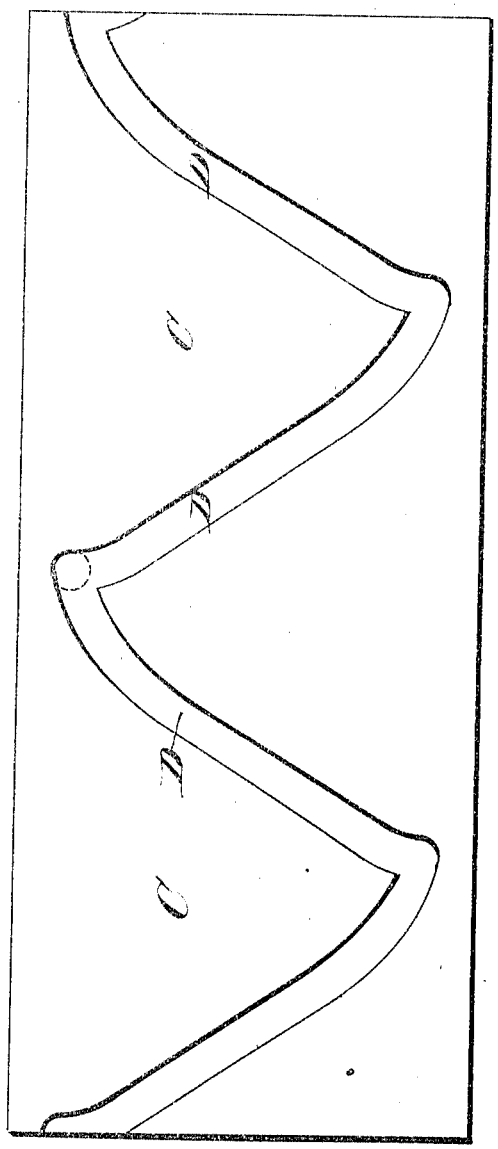

UNITED STATES PATENT OFFICE.

SAMUEL ISAAC PARKER, OF TEDDINGTON, ENGLAND.

VALVE AND VALVE-ACTUATING ARRANGEMENT OF INTERNAL-COMBUSTION ENGINES.

964,308.   Specification of Letters Patent.   Patented July 12, 1910.

Application filed September 17, 1909. Serial No. 518,209.

*To all whom it may concern:*

Be it known that I, SAMUEL ISAAC PARKER, a subject of the King of Great Britain and Ireland, and resident of Teddington, county of Middlesex, England, have invented certain new and useful Improvements in Valves and Valve-Actuating Arrangements of Internal-Combustion Engines, of which the following is a specification.

This invention relates to internal combustion engines and has particular reference to the valves and valve-actuating means of such engines, the chief object being to provide an improved distributing valve arrangement whereby the mushroom or other valves for the inlet and exhaust, and the necessary actuating gear for the same, are dispensed with.

According to this invention I provide a cylindrical distributing valve inclosing the piston, which valve is formed with a port or ports and rotated to cover or uncover the inlet and exhaust ports in the wall of the cylinder in proper sequence by means of a projection on the piston or on a member attached to the piston engaging in a suitable cam groove formed in the distributing valve. The said cam groove may be so constructed that the valve has imparted thereto a step-by-step rotary movement in one direction. The said valve during one revolution opens the inlet port, closes both the inlet and exhaust ports during compression and explosion, and opens the exhaust port during the scavenging stroke of the piston.

In order that my said invention may be clearly understood and readily carried into effect I will describe the same more fully with reference to the accompanying drawings in which:—

Figure 1:
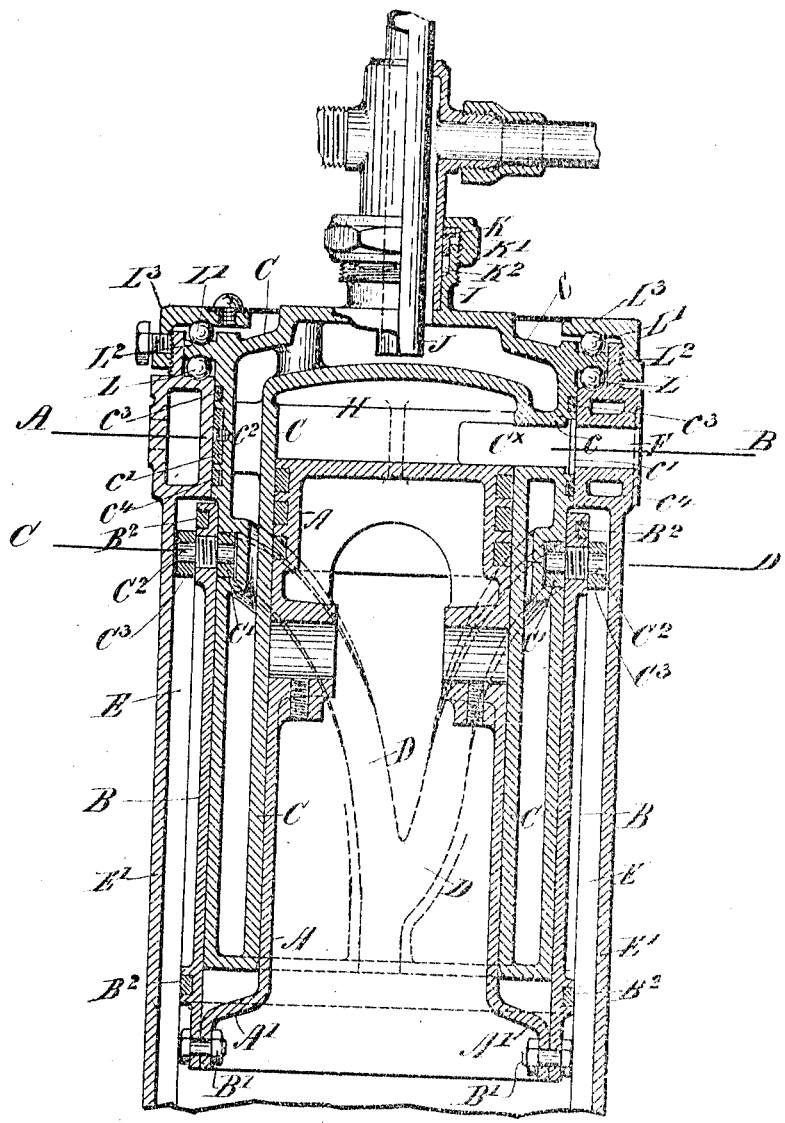
Figure 2:
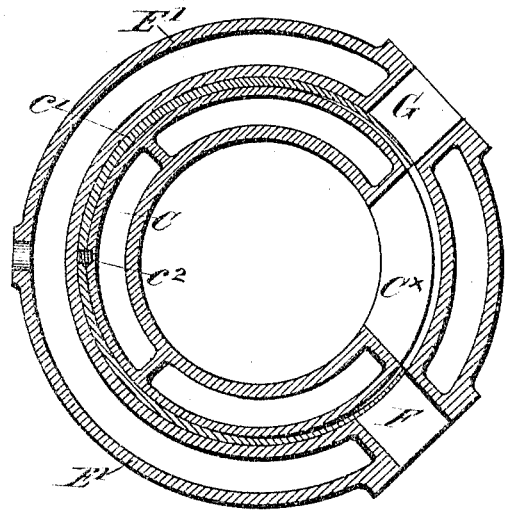
Figure 3:
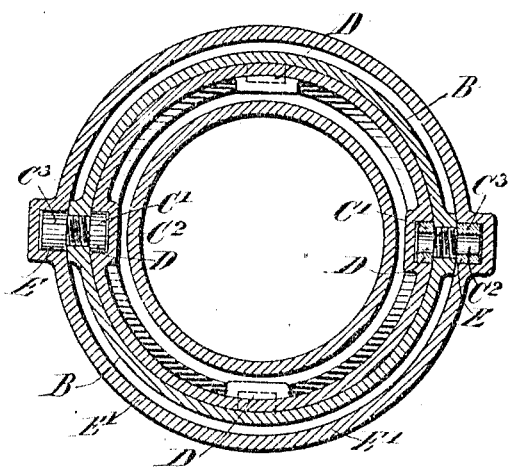
Figure 4:
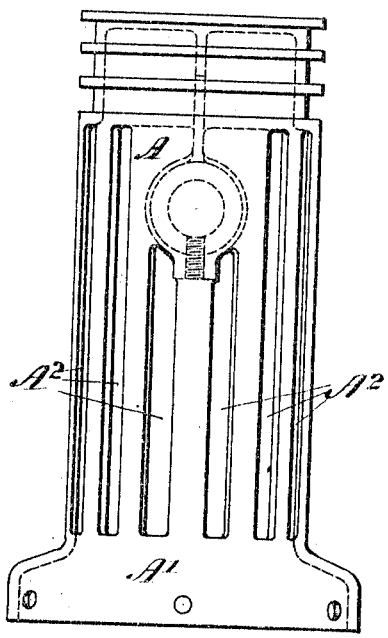
Figure 5:
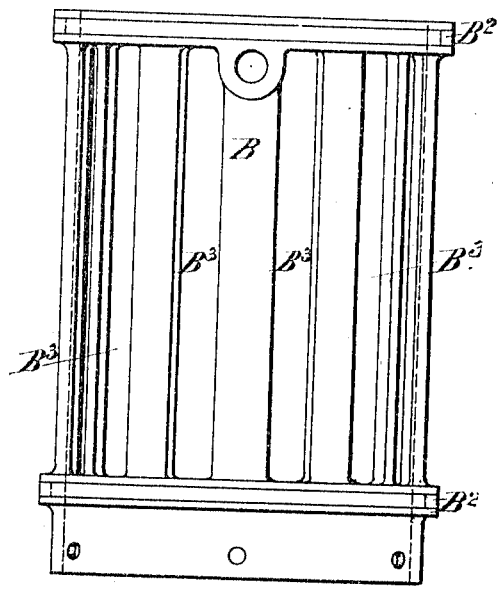

Figure 1 is a sectional elevation. Fig. 2 is a cross section on the line A, B of Fig. 1. Fig. 3 is a cross section on the line C, D of Fig. 1. Figs. 4 and 5 are elevations of the inner and outer piston respectively; and, Fig. 6 is a view showing the development of the cam groove formed in the distributing valve.

A is the piston provided at its lower end with an enlargement A' which forms a flange to which an outer piston B of annular shape may be attached by means of bolts B' or the like, so that the inner and outer pistons travel in unison. Between the said pistons A and B is the distributing valve C which is caused to rotate by the engagement of two rollers C' in a cam groove D formed in the outer surface of the distributing valve C. The said groove, which is the same height as the stroke of the piston, is continuous around the surface of the valve as shown in Fig. 6, the valve advancing through an angle of 90° on each of the downward and upward strokes of the piston. The aforesaid rollers C' are mounted on pins $C^2$ screwed in the outer piston B, each of the said pins $C^2$ also serving as a spindle upon which a roller $C^3$ rotates. The said rollers $C^3$ engage in longitudinal straight grooves E formed in the wall E' of the cylinder, thus preventing any tendency of the two pistons to rotate, due to the friction between the said pistons and the rotating valve.

The rotary valve C is formed with a port $C^x$ at a height corresponding to that of the inlet and exhaust ports F and G, the said port $C^x$ being of such a width that the inlet and exhaust ports are never at the same time in communication with the combustion chamber.

The outer surface of the valve C is formed with a circumferential groove c' of slightly greater width than the height of the port $C^x$, within which groove is a ring c', which is retained in position on the valve by a set screw $c^2$ or by other suitable means. The ring c' is discontinuous, leaving a gap of width corresponding to that of the port $C^x$. Rings of smaller width, and of usual construction $c^3$, $c^4$ are also provided, one above and one below the broad ring c'. The valve C which is constructed with a jacket for the reception of water is closed in at the top to form the combustion chamber H between it and the piston, the outer casing of the valve being provided with a screwed neck I for the water inlet and outlet pipes. A central pipe J serves as the water inlet, while a coaxial pipe K of larger diameter is the outlet. To allow relative movement between the said water pipes and the neck I of the valve, the outlet pipe K fits loosely therein and the said neck is provided with a suitable gland K' and packing $K^2$.

To prevent longitudinal movement of the distributing valve two series of balls L, L' are provided, the balls L placed between a flange $L^2$ of the valve and the wall E' of the cylinder serving to prevent downward displacement of the valve, while the balls L' are placed between the said flange L² and a cap L³ screwed on the cylinder, to prevent upward movement of the valve.

The outer piston B is provided with rings B² and is formed with a number of slots B³. The inner piston A is also lightened in a similar manner by means of slots A².

Having now described my invention, what I claim as new and desire to secure by Letters Patent of the United States is:—

1. An internal combustion engine, comprising a piston member, an angularly displaceable controlling valve member, and means for displacing the valve upon the movement of the piston, said means including a cam-way formed in one member, and a projection movable in the cam-way and carried by the other member.

2. An internal combustion engine, comprising a piston, an angularly displaceable controlling valve having a cam-way, and a projection moved by the piston and operating in the cam-way, to move the valve upon the movement of the piston.

3. In an internal combustion engine, a piston, a rotatable valve having a continuous cam-way, and a projection carried by the piston and operating in the cam-way to effect a step-by-step rotation of the valve.

4. In an internal combustion engine, a cylinder having a longitudinal groove, a rotary valve located in the cylinder and having a cam groove, and a reciprocatory piston having projections operating in both grooves.

5. In an internal combustion engine, a rotary valve constituting an explosion chamber, a reciprocatory piston operating in the valve, and means operated by the piston for effecting a step-by-step rotary movement of the valve.

6. In an internal combustion engine, a rotary valve constituting an explosion chamber, a reciprocatory piston operating therein, and means carried directly by the piston and engaging the valve for effecting its rotary movement.

7. In an internal combustion engine, a cylinder, a rotary valve located therein and constituting an explosion chamber, a reciprocatory piston operating in the rotary valve, and means connected to the piston and interposed between the cylinder and valve for effecting the movement of said valve.

8. In an internal combustion engine, a cylinder, a rotary valve located therein and spaced therefrom, an inner piston operating in the valve, an outer piston connected thereto and operating between the valve and cylinder, and means carried by the outer piston and engaging the valve for operating it.

9. In an internal combustion engine, a cylinder, a rotary valve located therein and spaced therefrom, said valve having a cam groove in its outer side, and said cylinder having a longitudinal groove in its inner side, a reciprocatory piston operating in the valve, an outer piston connected to the reciprocatory piston and interposed between the valve and cylinder, and projections carried by the outer piston and operating in the grooves.

In testimony whereof I have affixed my signature.

SAMUEL ISAAC PARKER.

In presence of—
 BENJ. THOS. KING,
 ROBT. HUNTER.